(12) United States Patent
Chen et al.

(10) Patent No.: US 11,150,718 B2
(45) Date of Patent: Oct. 19, 2021

(54) SYSTEM AND METHOD FOR STEPWISE ENABLEMENT OF A CACHE MEMORY IN AN INFORMATION HANDLING SYSTEM

(71) Applicant: Dell Products L.P., Round Rock, TX (US)

(72) Inventors: Xu Chen, Shanghai (CN); Michael Sean Gregoire, Waltham, MA (US); Qiu Lin Cheng, Shanghai (CN); Qi Liu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 16/655,480

(22) Filed: Oct. 17, 2019

(65) Prior Publication Data

US 2021/0116984 A1    Apr. 22, 2021

(51) Int. Cl.
| | |
|---|---|
| *G06F 1/00* | (2006.01) |
| *G06F 1/3212* | (2019.01) |
| *G06F 1/3225* | (2019.01) |
| *G06F 12/0802* | (2016.01) |
| *G06F 12/02* | (2006.01) |
| *G06F 1/3296* | (2019.01) |
| *G06F 1/3203* | (2019.01) |

(52) U.S. Cl.
CPC .......... *G06F 1/3212* (2013.01); *G06F 1/3225* (2013.01); *G06F 1/3296* (2013.01); *G06F 12/0246* (2013.01); *G06F 12/0802* (2013.01); *G06F 1/3203* (2013.01)

(58) Field of Classification Search
CPC .. G06F 1/3212; G06F 1/3225; G06F 12/0246; G06F 1/3296; G06F 12/0802
USPC .......................................................... 713/300
See application file for complete search history.

(56) References Cited

U.S. PATENT DOCUMENTS

| | | | | |
|---|---|---|---|---|
| 6,055,640 | A * | 4/2000 | Kageshima | G06F 9/30 713/320 |
| 10,860,227 | B2 * | 12/2020 | Jin | G06F 3/0634 |
| 2010/0023674 | A1 * | 1/2010 | Aviles | H04L 67/1097 711/103 |
| 2012/0173907 | A1 * | 7/2012 | Moses | G06F 1/3225 713/321 |
| 2016/0147583 | A1 * | 5/2016 | Simhon et al. | H04L 43/0823 714/47.3 |
| 2018/0262991 | A1 * | 9/2018 | Rao | H04L 43/0817 |
| 2019/0065388 | A1 * | 2/2019 | Christensen | G06F 3/0679 |

* cited by examiner

*Primary Examiner* — Volvick Derose
(74) *Attorney, Agent, or Firm* — Baker Botts L.L.P.

(57) ABSTRACT

Methods, systems, and computer programs for identifying, by an operating system, a power consumption level associated with a platform configuration of the information handling system; identifying, by the operating system, a bandwidth associated with a flash memory medium of the information handling system; identifying a first battery charge level associated with a battery of the information handling system, the battery in a charging state; determining a first cache size based on the power consumption level associated with the platform configuration, the bandwidth associated with the flash memory medium, and the first battery charge level associated with the battery; and enabling a first portion of the cache memory based on the determined first cache size.

17 Claims, 5 Drawing Sheets

| Platform Configuration 310 | Bandwidth 320 | Power Consumption Level 330 | Cache Size 340 | Modified Cache Size 350 |
|---|---|---|---|---|
| Platform A | 200 MB/s | 110 W | 17 GB | 28 GB |
| Platform B | 200 MB/s | 130 W | 17 GB | 23 GB |
| Platform C | 200 MB/s | 180 W | 17 GB | 17 GB |
| Upgraded Platform A | 500 MB/s | 110 W | 17 GB | 69 GB |
| Upgraded Platform B | 500 MB/s | 130 W | 17 GB | 59 GB |
| Upgraded Platform C | 500 MB/s | 180 W | 17 GB | 42 GB |

SYSTEM AND METHOD FOR STEPWISE ENABLEMENT OF A CACHE MEMORY IN AN INFORMATION HANDLING SYSTEM

BACKGROUND

Field of the Disclosure

This disclosure relates generally to information handling systems and more particularly to stepwise enablement of a cache memory in an information handling system in response to a power-loss event.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method for stepwise enablement of a cache memory in an information handling system in response to a power-loss event, where the method includes identifying, by an operating system, a power consumption level associated with a platform configuration of the information handling system; identifying, by the operating system, a bandwidth associated with a flash memory medium of the information handling system; identifying a first battery charge level associated with a battery of the information handling system, the battery in a charging state; determining a first cache size based on the power consumption level associated with the platform configuration, the bandwidth associated with the flash memory medium, and the first battery charge level associated with the battery; and enabling a first portion of the cache memory based on the determined first cache size.

In one or more of the disclosed embodiments, the method further comprises monitoring, by the operating system, the battery in the charging state; identifying a second battery charge level associated with the battery, the second battery charge level having a higher charge level than the first battery charge level; and in response to identifying the second battery charge level: determining a second cache size based on the power consumption level associated with the platform configuration, the bandwidth associated with the flash memory medium, and the second battery charge level, the second cache size having a larger cache size than the first cache size; and enabling a second portion of the cache memory based on the determined second cache size.

In one or more of the disclosed embodiments, monitoring the battery in the charging state comprises: receiving, by the operating system, a current charge level of the battery in the charging state, the current charge level received from a battery controller associated with the battery, the battery controller comprising an interface between the battery and the operating system.

In one or more of the disclosed embodiments, identifying the bandwidth associated with the flash memory medium comprises: accessing, by the operating system, a device descriptor stored in the flash memory medium; and retrieving information describing the bandwidth associated with the flash memory medium from the device descriptor.

In one or more of the disclosed embodiments, identifying the power consumption level associated with the platform configuration comprises: accessing, by the operating system, a platform descriptor stored in the information handling system; and retrieving information describing the power consumption level from the platform descriptor.

In one or more of the disclosed embodiments, the platform configuration of the information handling system comprises at least one of: a processor; a volatile memory medium including the cache memory; and the flash memory medium.

In one or more of the disclosed embodiments, the battery is in the charging state in response to a power-loss event, where the power-loss event comprises a loss of power being supplied to the information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
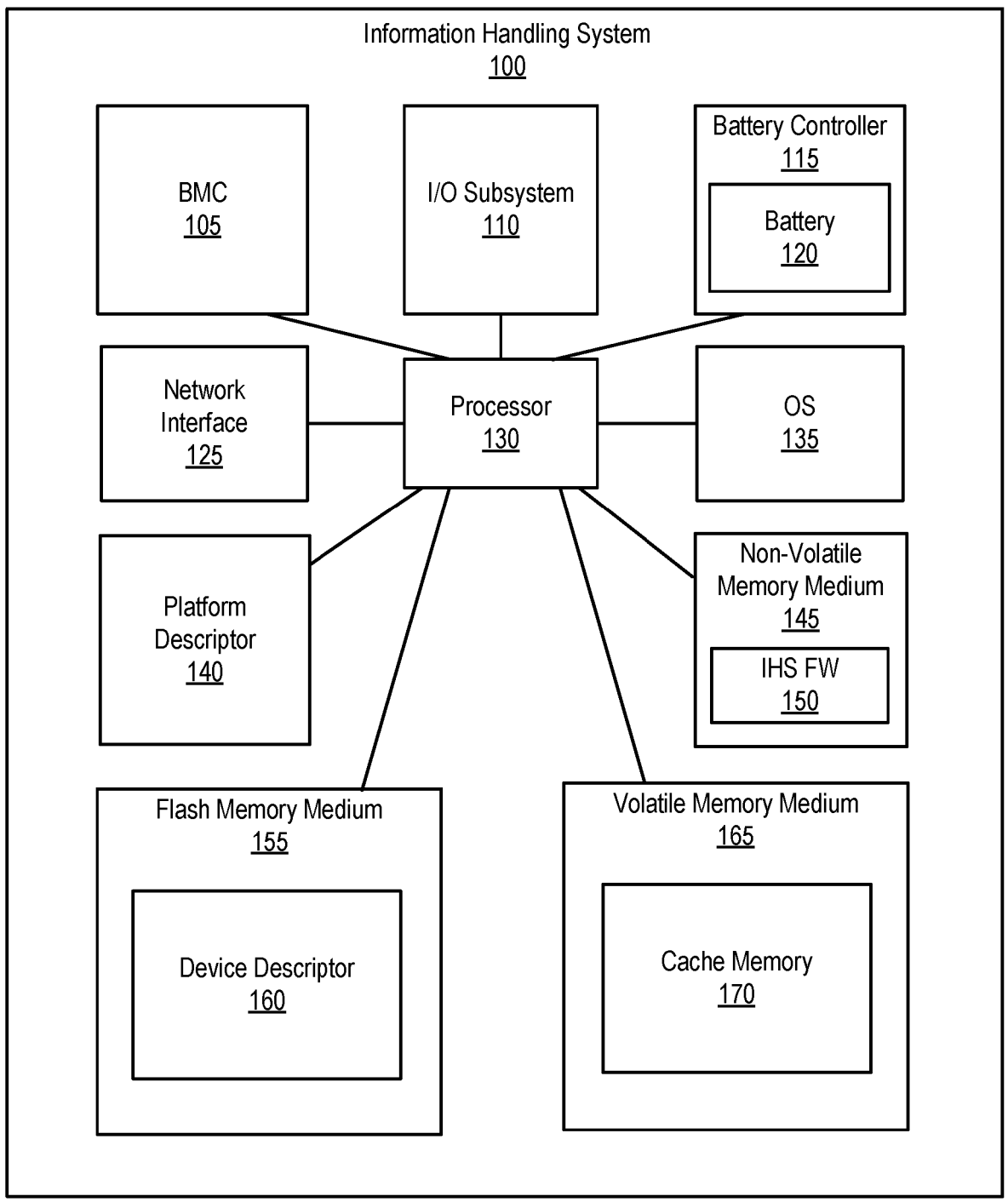
FIG. 1 illustrates a block diagram of selected elements of an embodiment of an information handling system.

This document describes a method and a system for stepwise enablement of a cache memory in an information handling system in response to a power-loss event. Specifically, this document describes identifying, by an operating system, a power consumption level associated with a platform configuration of the information handling system; identifying, by the operating system, a bandwidth associated with a flash memory medium of the information handling system; identifying a first battery charge level associated with a battery of the information handling system, the battery in a charging state; determining a first cache size based on the power consumption level associated with the platform configuration, the bandwidth associated with the flash memory medium, and the first battery charge level associated with the battery; and enabling a first portion of the cache memory based on the determined first cache size.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

FIG. 1 illustrates a block diagram of selected elements of an embodiment of an information handling system. An information handling system (IHS) 100 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 100 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 100 may include or have a form factor of that of or similar to one or more of a laptop, a notebook, a telephone, a tablet, and a PDA, among others. For example, a portable IHS 100 may be readily carried and/or transported by a user (e.g., a person). In one or more embodiments, components of IHS 100 may include one or more storage devices, one or more communications ports for communicating with external devices as well as various input and output (I/O) devices, such as a keyboard, a mouse, and a video display, among others. In one or more embodiments, IHS 100 may include one or more buses operable to transmit communication between or among two or more hardware components. In one example, a bus of IHS 100 may include one or more of a memory bus, a peripheral bus, and a local bus, among others. In another example, a bus of IHS 100 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 100 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown in FIG. 1, IHS 100 may include a baseboard management controller (BMC) 105, an I/O subsystem 110, a battery controller 115 that includes a battery 120, a network interface 125, a processor 130, an operating system (OS) 135, a platform descriptor 140, a non-volatile memory medium 145 that includes information handling system firmware (IHS FW) 150, a flash memory medium 155 that includes a device descriptor 160, and a volatile memory medium 165 that includes cache memory 170. As illustrated, BMC 105, I/O subsystem 110, battery controller 115, network interface 125, OS 135, platform descriptor 140, non-volatile memory medium 145, flash memory medium 155, and volatile memory medium 165 may be communicatively coupled to processor 130.

In one or more embodiments, one or more of BMC 105, I/O subsystem 110, battery controller 115, network interface 125, OS 135, platform descriptor 140, non-volatile memory medium 145, flash memory medium 155, and volatile memory medium 165 may be communicatively coupled to processor 130 via one or more buses, one or more switches, and/or one or more root complexes, among others. In one example, one or more of BMC 105, I/O subsystem 110, battery controller 115, network interface 125, OS 135, platform descriptor 140, non-volatile memory medium 145, flash memory medium 155, and volatile memory medium 165 may be communicatively coupled to processor 130 via one or more PCI-Express (PCIe) root complexes.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

In one or more embodiments, network interface 125 may be utilized in communicating with one or more networks and/or one or more other information handling systems. In one example, network interface 125 may enable IHS 100 to communicate via a network utilizing a suitable transmission protocol and/or standard. In a second example, network interface 125 may be coupled to a wired network. In a third example, network interface 125 may be coupled to an optical network. In another example, network interface 125 may be coupled to a wireless network.

In one or more embodiments, network interface 125 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 130 may execute processor instructions in implementing one or more systems, one or more flowcharts, one or more methods, and/or one or more processes described herein. In one example, processor 130 may execute processor instructions from one or more of memory media 165-145 in implementing one or more systems, one or more flowcharts, one or more methods, and/or one or more processes described herein. In another example, processor 130 may execute processor instructions via network interface 125 in implementing one or more systems, one or more flowcharts, one or more methods, and/or one or more processes described herein.

In one or more embodiments, processor 130 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 130 may interpret and/or execute program instructions and/or process data stored locally (e.g., via memory media 165-145 and/or another component of IHS 100). In another example, processor 130 may interpret and/or execute program instructions and/or process data stored remotely (e.g., via a network storage resource).

In one or more embodiments, I/O subsystem 110 may represent a variety of communication interfaces, graphics interfaces, video interfaces, user input interfaces, and/or peripheral interfaces, among others. For example, I/O subsystem 110 may include one or more of a touch panel and a display adapter, among others. For instance, a touch panel may include circuitry that enables touch functionality in conjunction with a display that is driven by a display adapter.

As depicted in FIG. 1, volatile memory medium 165 may comprise a system, device, or apparatus operable to provide volatile storage for client data in IHS 100. Volatile memory medium 165 may include volatile storage such as, for example, RAM, DRAM (dynamic RAM), EDO RAM (extended data out RAM), SRAM (static RAM), etc.

As depicted in FIG. 1, cache memory 170 may comprise a system, device, or apparatus operable for providing volatile storage for client data in IHS 100. In particular, cache memory 170 may be or include an auxiliary memory that allows a high-speed retrieval of client data stored therein. In one embodiment, the client data stored in cache memory 170 may be written out, or "transferred," to persistent memory in response to a loss of alternating current (AC) power supplied to IHS 100, or a "power-loss event." Specifically, in response to a power-loss event, client data may be transferred from cache memory 170 to flash memory medium 155 such that the client data is not lost due to the power-loss event. In one embodiment, IHS FW 150 may access cache memory 170 during the power-loss event to transfer the client data stored therein.

In one embodiment, portions of cache memory 170 may be stepwise enabled such that a client and/or administrator may resume storing client data into cache memory 170 following a power-loss event. These portions of cache memory 170 may be stepwise enabled by OS 135 such that client data written to a portion of cache memory 170 following the power-loss event may be protected from becoming lost in the event of an additional power-loss event. In particular, a portion of cache memory 170 may be enabled for storage based on the energy required to transfer the client data from the portion of cache memory 170 to a persistent memory during a power-loss event. Stepwise cache enablement is described in greater detail with respect to FIGS. 2A-C.

As depicted in FIG. 1, flash memory medium 155 may comprise a system, device, or apparatus operable to provide non-volatile storage for client data in IHS 100. In particular, flash memory medium 155 may be or include a non-volatile memory used to store client data from cache memory 170 during a power-loss event. In one embodiment, IHS FW 150 may access flash memory medium 155 to store the client data from cache memory 170 during the power-loss event. In one embodiment, flash memory medium 155 may be or include an M.2 storage device that receives client data via PCI Express (PCIe), USB, and/or SATA bus. In other embodiments, flash memory medium 155 may be or include a solid-state drive (SSD), hybrid drive, solid-state hybrid drive (SSHS), and/or any other non-volatile storage device suitable for persistent storage of client data.

As depicted in FIG. 1, device descriptor 160 may comprise a system, device, or apparatus operable to store information describing flash memory medium 155. In particular, device descriptor 160 may include one or more fields that store information describing flash memory medium 155. For example, device descriptor 160 may include one or more fields describing any unique numbers, vendor identification, and/or product identification of flash memory medium 155. In one embodiment, OS 135 can use the information describing flash memory medium 155 to select a device driver that allows communication between OS 135 and flash memory medium 155. In addition, device descriptor 160 may include one or more reserved fields that may be used to store performance metrics associated with flash memory medium 155. In one embodiment, OS 135 can access the reserved fields of device descriptor 160 to identify the performance metrics associated with flash memory medium 155. For example, OS 135 can access the reserved fields to identify a bandwidth associated with flash memory medium 155. In another embodiment, battery controller 115 may access the reserved fields to identify the bandwidth associated with flash memory medium 155.

By storing performance metrics associated with flash memory medium 155 within the reserved fields of device descriptor 160, the performance metrics may be readily accessed upon communicatively coupling flash memory medium 155 to IHS 100. This affords increased modularity in that OS 135 can identify a bandwidth associated with a new flash memory medium if flash memory medium 155 is replaced, upgraded, or otherwise removed from IHS 100. In one embodiment, performance metrics may be stored in the reserved fields of device descriptor 160 in a post manufacturer environment. Specifically, performance metrics may be collected by a client and/or administrator of IHS 100 and stored in the reserved fields of device descriptor 160. In another embodiment, performance metrics may be stored in device descriptor 160 by a manufacturer of flash memory medium 155. In one embodiment, device descriptor 160 may be or include vital product data (VPD) associated with a particular flash memory medium.

As depicted in FIG. 1, platform descriptor 140 may comprise a system, device, or apparatus operable to store information describing attributes associated with an IHS 100 platform. In one embodiment, a platform descriptor 140 may include one or more fields that contain information describing a platform type, or "platform configuration," of IHS 100. In one embodiment, a configuration of an IHS platform may include a particular set of hardware or software of various manufacturers and performance metrics. For example, a platform descriptor 140 may include one or more fields that contain attributes associated with a platform configuration that includes a processor, a volatile memory medium, and a flash memory medium. In one embodiment, platform descriptor 140 may store information describing a power consumption associated with an IHS 100 platform configuration. For example, platform descriptor 140 may store information describing the power consumption associated with a platform configuration that includes a processor, a volatile memory medium, and a flash memory medium. In one embodiment, platform descriptor 140 may be or include vital product data (VPD) associated with a particular platform configuration.

As depicted in FIG. 1, battery controller 115 may comprise a system, device, or apparatus operable to manage and support battery 120 of IHS 100. In particular, battery controller 115 may be or include a programmable interface that allows IHS 100 to access information associated with battery 120. In one embodiment, battery controller 115 may identify a loss of AC power supplied to IHS 100 and can notify IHS 100 of the power-loss event. For example, battery controller 115 may notify BMC 105 of a power-loss event in response to identifying a loss of AC power. In addition, battery controller 115 can monitor a battery charge level of battery 120 once AC power has been restored to IHS 100 following a power-loss event. In one embodiment, battery controller 115 can monitor a current battery charge level of battery 120 while battery 120 is in a charging state and can notify OS 135 of the current battery charge level as the battery charge level increases.

As depicted in FIG. 1, battery 120 may comprise a system, device, or apparatus operable to supply hold-up energy to IHS 100 in response to a power-loss event. As referred to herein, "hold-up energy" may represent the amount of energy (e.g., power×time) available to supply IHS 100 during a power-loss event. Specifically, hold-up energy supplied by battery 120 during a power-loss event may provide IHS 100 with the energy required to transfer client data from a volatile memory to a non-volatile memory such that client data is not lost due to the power-loss event. The hold-up energy supplied by battery 120 may be depleted as client data is transferred during the power-loss event due, in part, to the platform configuration of IHS 100. For example, a depletion of hold-up energy during the transfer of client data from a volatile memory medium to a non-volatile memory may depend on the power consumption associated with the platform configuration, a bandwidth associated with the non-volatile memory, an amount of client data to transfer from the volatile memory medium to the non-volatile memory, and/or other factors. Once AC power is restored to IHS 100 following the power-loss event, battery 120 may enter a charging state in which a battery charge level of battery 120 increases. Battery 120 may remain in the charging state until the battery 120 has been fully charged.

In one or more embodiments, BMC 105 may be or include a remote access controller. For example, the remote access controller may be or include a Dell Remote Access Controller (DRAC). In one or more embodiments, a remote access controller may be integrated into IHS 100. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more buses and/or one or more portions of IHS 100. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an IHS as if the administrator was at a console of the IHS and/or had physical access to the IHS.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 105 may be or include a microcontroller. For example, the microcontroller may be or include an 8051 microcontroller, an ARM Cortex-M (e.g., Cortex-M0, Cortex-M02, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 105 may be or include an application processor. In one example, BMC 105 may be or include an ARM Cortex-A processor. In another example, BMC 105 may be or include an Intel Atom processor. In one or more embodiments, BMC 105 may be or include one or more of a field programmable gate array (FPGA) and an ASIC, among others, configured, coded, and/or encoded with instructions in accordance with at least a portions of one or more of systems, one or more flowcharts, one or more methods, and/or one or more processes described herein.

As illustrated, non-volatile memory medium 145 may include information handling system firmware (IHS FW) 150. In one or more embodiments, IHS FW 150 may include processor instructions executable by processor 130. For example, IHS FW 150 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 130 may execute processor instructions of IHS FW 150 via non-volatile memory medium 145. In another instance, one or more portions of the processor instructions of IHS FW 150 may be transferred to volatile memory medium 165, and processor 130 may execute the one or more portions of the processor instructions of IHS FW 150 via volatile memory medium 165.

In one embodiment, IHS FW 150 may transfer client data from a volatile memory to a non-volatile memory in response to a power-loss event. In particular, IHS FW 150 may transfer client data stored in cache memory 170 to flash memory medium 155 such that the client data is not lost due to the power-loss event. IHS 100 may boot once AC power has been restored to IHS 100 following the power-loss event.

As depicted in FIG. 1, OS 135 may comprise a system, device, or apparatus operable to stepwise enable portions of cache memory 170 following a power-loss event. In particular, OS 135 may communicate with battery controller 115 to monitor a battery charge level while battery 120 is in a charging state following the power-loss event. OS 135 may also access platform descriptor 140 to identify a power consumption level associated with the platform configuration of IHS 100. In addition, OS 135 may access device descriptor 160 of flash memory medium 155 to identify a bandwidth associated with flash memory medium 155. OS 135 may use the battery charge level associated with battery 120, the power consumption level associated with the platform configuration of IHS 100, and the bandwidth associated with flash memory medium 155 to determine a cache size to enable in cache memory 170 such that client data written to cache memory 170 following the power-loss event is protected from becoming lost in the event of an additional power-loss event. That is, OS 135 ensures that client data can be successfully transferred from cache memory 170 to flash memory medium 155 without fully depleting hold-up energy supplied by battery 120 in the event of an additional power-loss event, power fault, and/or any other loss of AC power following an initial power-loss event. As battery 120 continues to charge once AC power is restored to IHS 100, OS 135 may continue to monitor the battery charge level of battery 120 and can dynamically determine additional cache sizes to enable in conjunction with an increased battery charge level. In doing so, OS 135 can stepwise enable portions of cache memory 170 according to the determined cache sizes as battery 120 continues to charge. In one embodiment, OS 135 may use the following formula to determine a cache size of cache memory 170 to enable:

$$\text{Energy Required} = \text{Platform Power Consumption} \times \frac{\text{Cache Size}}{\text{Bandwidth}}$$

In the formula above, "Energy Required" may be or include a battery charge level of battery 120. For example, energy required may describe a current charge level of battery 120 while in a charging state after AC power has been restored to IHS 100. In one embodiment, battery controller 115 may monitor a current battery charge level of battery 120 and notify OS 135 of the current battery charge level such that OS 135 may enable a portion of cache memory 170 accordingly. "Platform Power Consumption" may be or include the power consumption level associated with the platform configuration of IHS 100. In one embodiment, platform power consumption level may be a cumulative power consumption level comprised of power consumption levels associated with processor 130, volatile memory medium 165, and flash memory medium 155. "Cache Size" may be or include the size of a portion of cache memory 170 that OS 135 may enable such that any client data stored within that cache size is protected during a power-loss event. As shown in the formula above, cache size may increase (i.e., larger portions of cache memory 170 may become enabled) as energy required increases (i.e., battery 120 continues to charge). "Bandwidth" may be or include a bandwidth associated with flash memory medium 155. As shown in the formula above, the energy required to transfer client data from cache memory 170 to flash memory medium 155 may increase as bandwidth decreases.

Conventionally, OS 135 may enable a cache memory following a power-loss event based on a worst-case platform configuration of IHS 100. Specifically, OS 135 may enable a cache memory based on worst-case performance metrics associated with various platform configurations of IHS 100. OS 135 may refrain from enabling the cache memory following the power-loss event until the worst-case performance metrics may be accommodated to protect client data from becoming lost if an additional power-loss event occurs following an initial power-loss event. For example, a given platform configuration of IHS 100 including a processor, volatile memory medium, and flash memory medium may generate an overall power consumption level of 180 W, while a different platform configuration of IHS 100 may generate an overall power consumption level of 110 W. Given that 180 W is a larger power consumption level than 110 W, OS 135 may refrain from enabling a cache memory to resume storing client data until a battery of IHS 100 in a charging state has reached a battery charge level of 180 W. That is, OS 135 may refrain from enabling the cache memory until the battery charge level of the battery may adequately supply IHS 100 with enough hold-up energy to transfer the client data to a non-volatile memory according to the worst-case power consumption level across all platform configurations. In a similar example, a given flash memory medium of a platform configuration may support a bandwidth of 200 MB/s, while a different flash memory medium may support a bandwidth of 500 MB/s. Because 200 MB/s is a worst-case bandwidth when compared to 500 MB/s, OS 135 may refrain from enabling a cache memory to store client data until a battery of IHS 100 in a charging state has reached a battery charge level that may accommodate the 200 MB/s bandwidth. Conventionally, these worst-case performance metrics may have been hard-coded into OS 135 (e.g., into the formula above), thereby forcing OS 135 to enable cache memory similarly across different platform configurations regardless of respective performance metrics (e.g., power consumption level and/or bandwidth). This conventional method based on worst-case performance metrics does not account for differences across platform configurations, thereby prolonging the amount of time between a power-loss event and cache memory becoming enabled for client use. Worst-case performance metrics are discussed in further detail with respect to FIG. 3.

In one or more embodiments, OS 135 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 100) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 135. In one or more embodiments, the management information exchange may utilize a Redfish standard application programming interface (API), available from the Distributed Management Task Force (DMTF). For example, one or more portions of the management information exchange may be compliant with one or more portions of a Redfish standard. For instance, one or more portions of the management information exchange may implement with one or more portions of a Redfish standard.

Figure 2A:
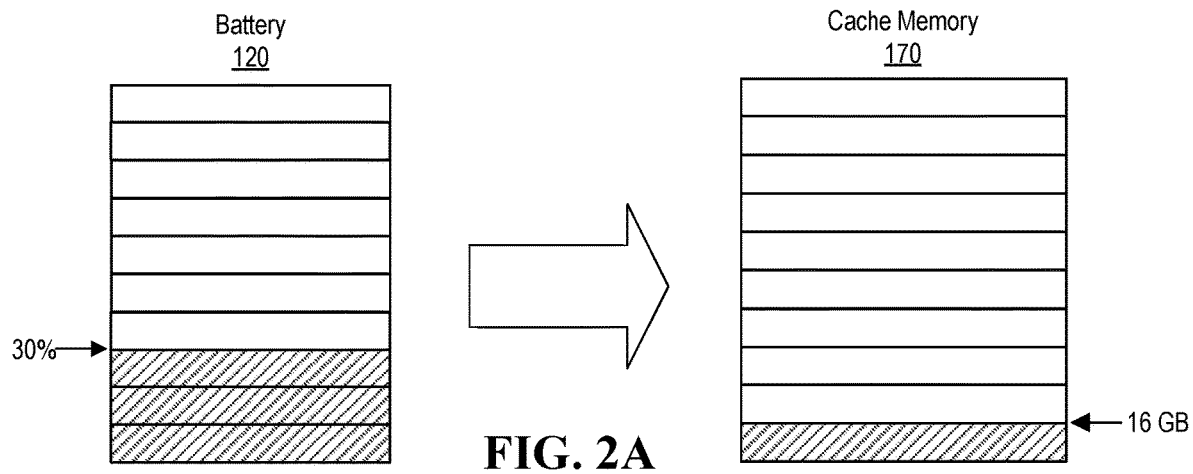
FIGS. 2A-C illustrate block diagrams of selected elements of an embodiment of a process for stepwise enablement of a cache memory in an information handling system.
Figure 2B:
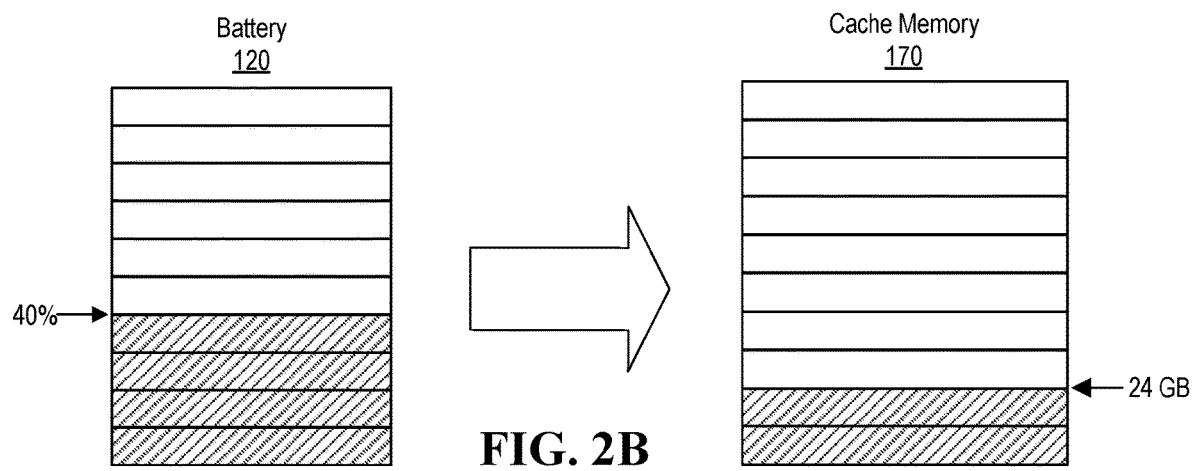
Figure 2C:
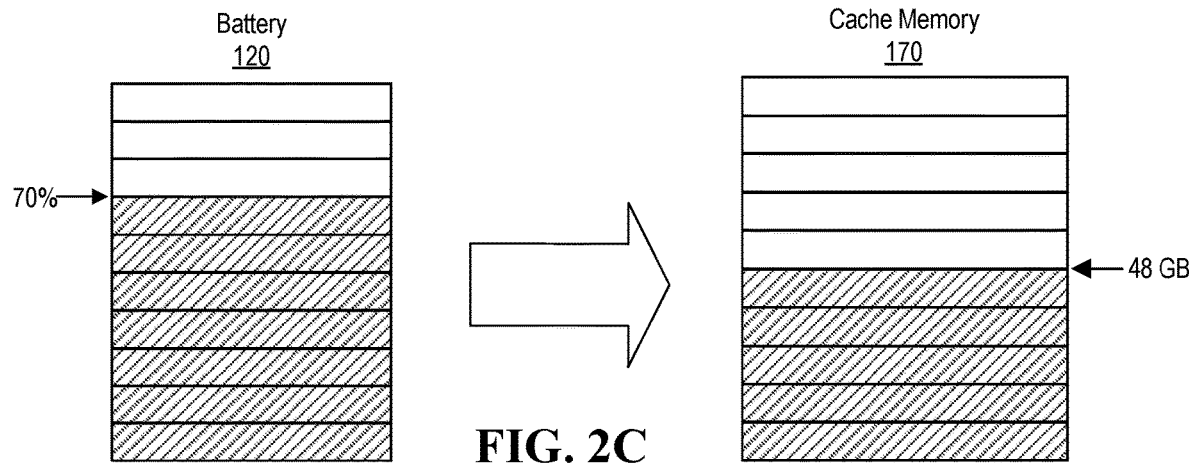

FIGS. 2A-C illustrate block diagrams of selected elements of an embodiment of a process for stepwise enablement of a cache memory in an information handling system. In particular, FIGS. 2A-C illustrate a process for stepwise enablement of cache memory 170 in response to a power-loss event. In the example illustrated in FIGS. 2A-C, the battery charge level of battery 120 has been depleted to 30% while providing hold-up energy during a power-loss event. In one embodiment, OS 135 may monitor a battery charge level of battery 120 and stepwise enable portions of cache memory 170 in accordance with increases in the battery charge level. In another embodiment, battery controller 115 may monitor the battery charge level and cause OS 135 to stepwise enable portions of cache memory 170 accordingly.

In the example illustrated in FIG. 2A, the battery charge level of battery 120 has been depleted to 30% while battery 120 previously supplied hold-up energy to IHS 100 during a power-loss event. Once AC power is restored to IHS 100, battery 120 may enter a charging state thereby increasing its battery charge level. In one embodiment, OS 135 can receive a current battery charge level of battery 120 from battery controller 115 while battery 120 is in the charging state. In another embodiment, OS 135 can monitor battery 120 directly while battery 120 is in the charging state. For example, OS 135 may monitor a current charge level of battery via a general purpose input/output (GPIO) port and/or $I^2C$ interface of IHS 100.

Once the battery charge level is identified, OS 135 can gather additional performance metrics to determine a cache size of cache memory 170 to enable. In particular, OS 135 can access device descriptor 160 in flash memory medium 155 to identify a bandwidth associated with flash memory medium 155. In one instance, OS 135 may retrieve information describing the bandwidth associated with flash memory medium 155 from one or more reserved fields in device descriptor 160. In addition, OS 135 can access platform descriptor 140 to identify a power consumption level associated with a platform configuration of IHS 100. In one instance, OS 135 may access one or more reserved fields of platform descriptor 140 to retrieve information describing the power consumption level associated with the platform configuration. In one embodiment, OS 135 may use the battery charge level of battery 120, the bandwidth associated with flash memory medium 155, and the power consumption level associated with the platform configuration of IHS 100 to determine a first cache size and may enable a first portion of cache memory 170 based on the determined first cache size. In the example illustrated in FIG. 2A, this first portion of cache memory 170 is 16 GB.

In the example illustrated in FIG. 2B, the battery charge level of battery 120 has increased from 30% to 40% as battery 120 remains in the charging state following the power-loss event. Accordingly, OS 135 can identify this 10% increase in battery charge level and may then determine a second cache size based on the increased battery charge level. As shown in the formula above, cache size may increase as battery charge level increases. This is shown in FIG. 2B where a 40% battery charge level of battery 120 may yield an 8 GB increase in cache size of cache memory 170 as cache memory 170 is increased from 16 GB of protected memory to 24 GB.

In the example illustrated in FIG. 2C, the battery charge level of battery 120 has increased from 40% to 70%. Upon identifying the increase in battery charge level, OS 135 can determine a third cache size based on the increased battery charge level. As shown in FIG. 2C, OS 135 may increase the cache size to 48 GB in accordance with a 30% increase in battery charge level (i.e., from 40% to 70%). In one embodiment, this stepwise enablement of cache memory 170 may continue until battery 120 has been fully charged. That is, OS 135 may continue to enable portions of cache memory 170 as battery 120 charges such that battery 120 may supply enough hold-up energy to transfer client data from the enabled portions of cache memory 170 to flash memory medium 155 in the event of an additional power-loss event. In doing so, a client and/or administrator of IHS 100 may resume storing client data into cache memory 170, or portions thereof, without waiting for OS 135 to enable cache memory 170 based on worst-case performance metrics.

Figure 3:
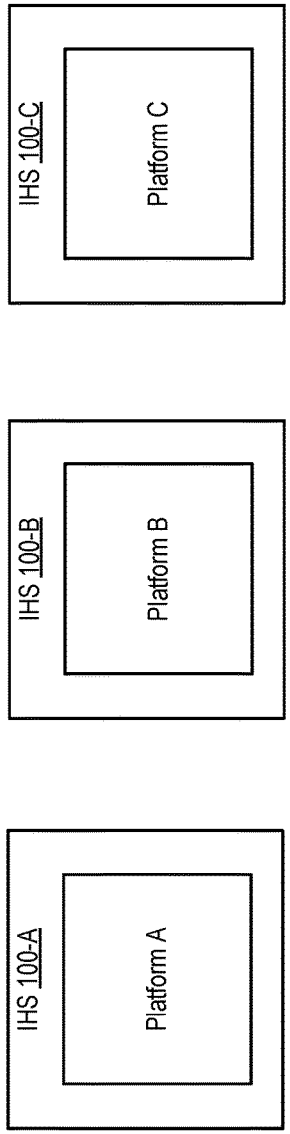
FIG. 3 illustrates a block diagram of selected elements of an embodiment of information handling systems including different platform configurations and a table of performance metrics associated with each platform configuration.

FIG. 3 illustrates a block diagram of selected elements of an embodiment of information handling systems including different platform configurations and a table of performance metrics associated with each platform configuration. In the embodiment illustrated in FIG. 3, information handling systems (IHSs) 100-A, 100-B, and 100-C (collectively referred to herein as IHSs 100) each include a different platform configuration. In particular, IHS 100-A includes platform A, IHS 100-B includes platform B, and IHS 100-C includes platform C. Each respective platform A, B, and C may include different device configurations. In general, each respective platform configuration of IHS 100 may include different processors, volatile memory media, and flash memory media configurations that may differ in bandwidth, power consumption levels, and cache size values. In the example illustrated in FIG. 3, platforms A, B, and C each differ in power consumption level 330 and modified cache size 350.

As shown in table 300 illustrated in FIG. 3, each platform configuration 310 of platforms A, B, and C may be associated with a bandwidth 320, power consumption level 330, cache size 340, and a modified cache size 350. Here, cache size 340 may refer to a fixed hard-coded value conventionally used by OS 135 to determine an amount of hold-up energy required to transfer client data from cache memory 170 to flash memory medium 155 during a power-loss event. As shown in table 300, platforms A, B, and C each include a flash memory medium 155 having a bandwidth 320 of 200 MB/s. Platform A generates a power consumption level 330 of 110 W, platform B generates a power consumption level 330 of 130 W, and platform C generates a worst-case power consumption level 330 of 180 W. Conventionally, OS 135 may use the worst-case power consumption level to determine the overall cache size 340 across platforms A, B, and C despite platforms A and B having a smaller power consumption level 330. That is, although platforms A and B are capable of supporting larger cache sizes 340, cache sizes 340 may be hard-coded according to the worst-case power consumption 330 (i.e., 180 W) and worst-case bandwidth 320 (i.e., 200 MB/s). This is shown in table 300 of FIG. 3 where platforms A, B, and C each include a cache size 340 of 17 GB.

As shown in table 300, upgraded platforms A, B, and C each include an upgraded flash memory medium 155 having a bandwidth 320 of 500 MB/s. Conventionally, OS 135 may not be notified or otherwise made aware of the updated bandwidth 320 given that the bandwidth value may be hard-coded in OS 135. This is shown in FIG. 3 where upgraded platforms A, B, and C each include a cache size 340 of 17 GB based on the worst-case bandwidth 320 of 200 MB/s. Here, despite upgraded platforms A, B, and C each including a larger bandwidth 320 for flash memory medium 155, cache size 340 for each upgraded platform A, B, and C is limited to that accounting for the worst-case bandwidth 320 of 200 MB/s and worst-case power consumption 330 of 180 W.

In accordance with the present disclosure, OS 135 may determine an increased cache size, or modified cache size 350, that may account for different bandwidths 320 and power consumption levels 330 across platform configurations. That is, rather than worst-case bandwidth and worst-case power consumption level values being hard-coded into OS 135, the code comprising OS 135 may be modified such that OS 135 can identify specific bandwidth and power consumption levels supported by a given platform configuration and can determine a modified cache size 350 per platform configuration 310. For example, OS 135 may determine a modified cache size 350 using the equation below:

$$\text{Modified Cache Size} = \frac{\text{Energy Required} \times \text{Bandwidth}}{\text{Power Consumption Level}}$$

In the equation above, OS 135 may use bandwidth 320 and power consumption level 330 values, in addition to a battery charge level of battery 120, for each platform configuration 310 to determine a modified cache size 350. In doing so, OS 135 may more intelligently enable larger portions of cache memory 170 thereby increasing overall modified cache size 350 of cache memory 170 in comparison to the conventional cache size 340. In the example illustrated in table 300, the modified cache sizes 350 of platforms A and B have increased from 17 GB to 28 GB and 23 GB, respectively. In addition, the modified cache sizes 350 of upgraded platforms A, B, and C have increased from 17 GB to 69 GB, 59 GB, and 42 GB, respectively. This increased modified cache size 350 may improve overall system performance of IHS 100 given the additional cache memory in which client data may be quickly stored and accessed.

Figure 4:
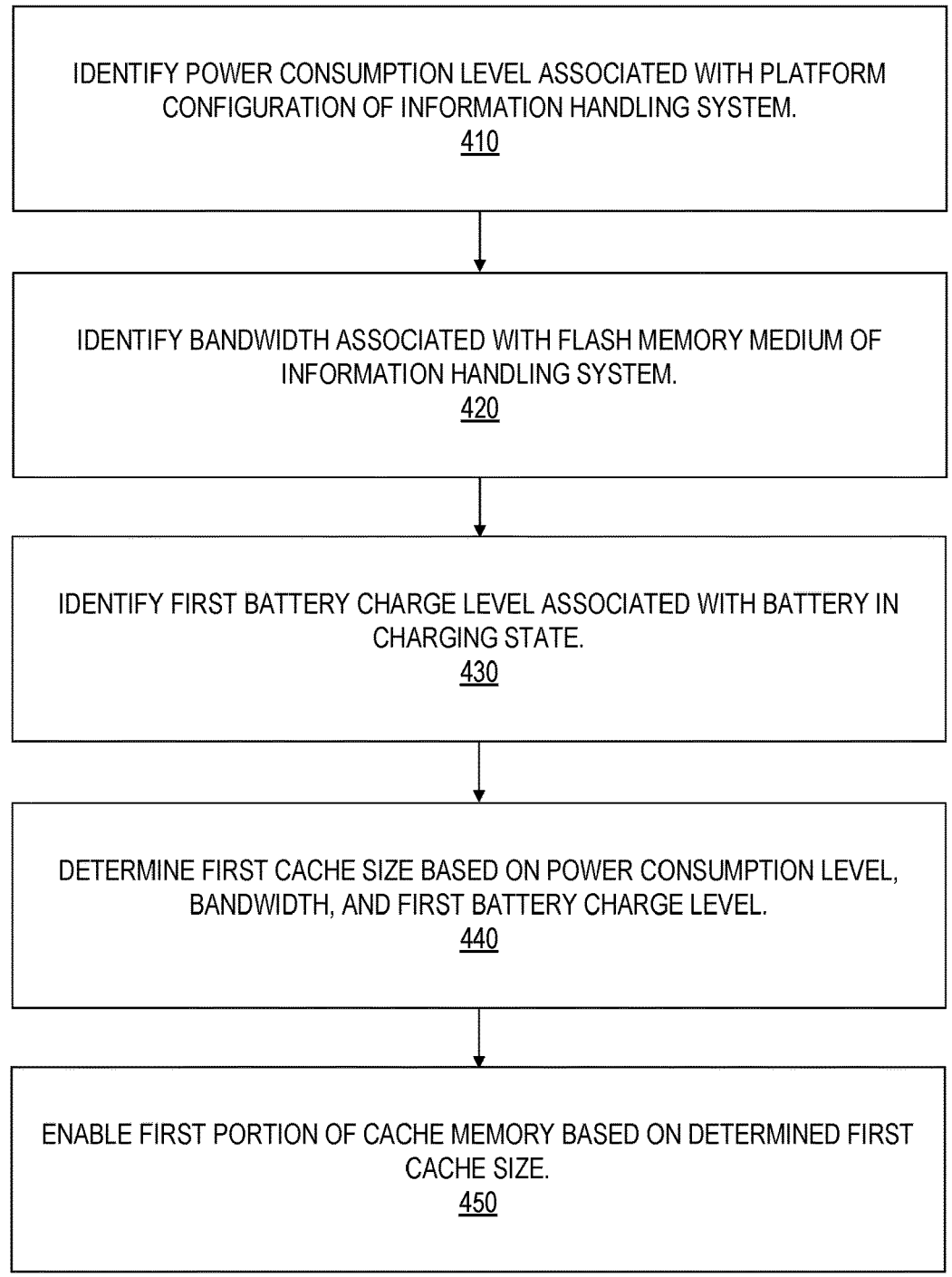
FIG. 4 illustrates a flowchart of selected elements of an embodiment of a method for enabling a first portion of a cache memory in an information handling system in response to a power-loss event.

FIG. 4 illustrates a flowchart of selected elements of an embodiment of a method for enabling a first portion of a cache memory in an information handling system in response to a power-loss event. It is noted that certain operations described in method 400 may be optional or may be rearranged in different embodiments.

In the method 400 illustrated in FIG. 4, OS 135 can identify 400 a power consumption level associated with a platform configuration of IHS 100. Similarly, OS 135 can identify 420 a bandwidth associated with flash memory medium 155 of IHS 100. In addition, OS 135 can identify 430 a first battery charge level associated with battery 120 in a charging state following a power-loss event. OS 135 can determine 440 a first cache size based on the power consumption level associated with the platform configuration, the bandwidth associated with the flash memory medium 155, and the first battery charge level associated with battery 120 in the charging state. OS 135 may enable 450 a first portion of cache memory 170 based on the determined first cache size such that client data may be stored within the first portion.

Figure 5:
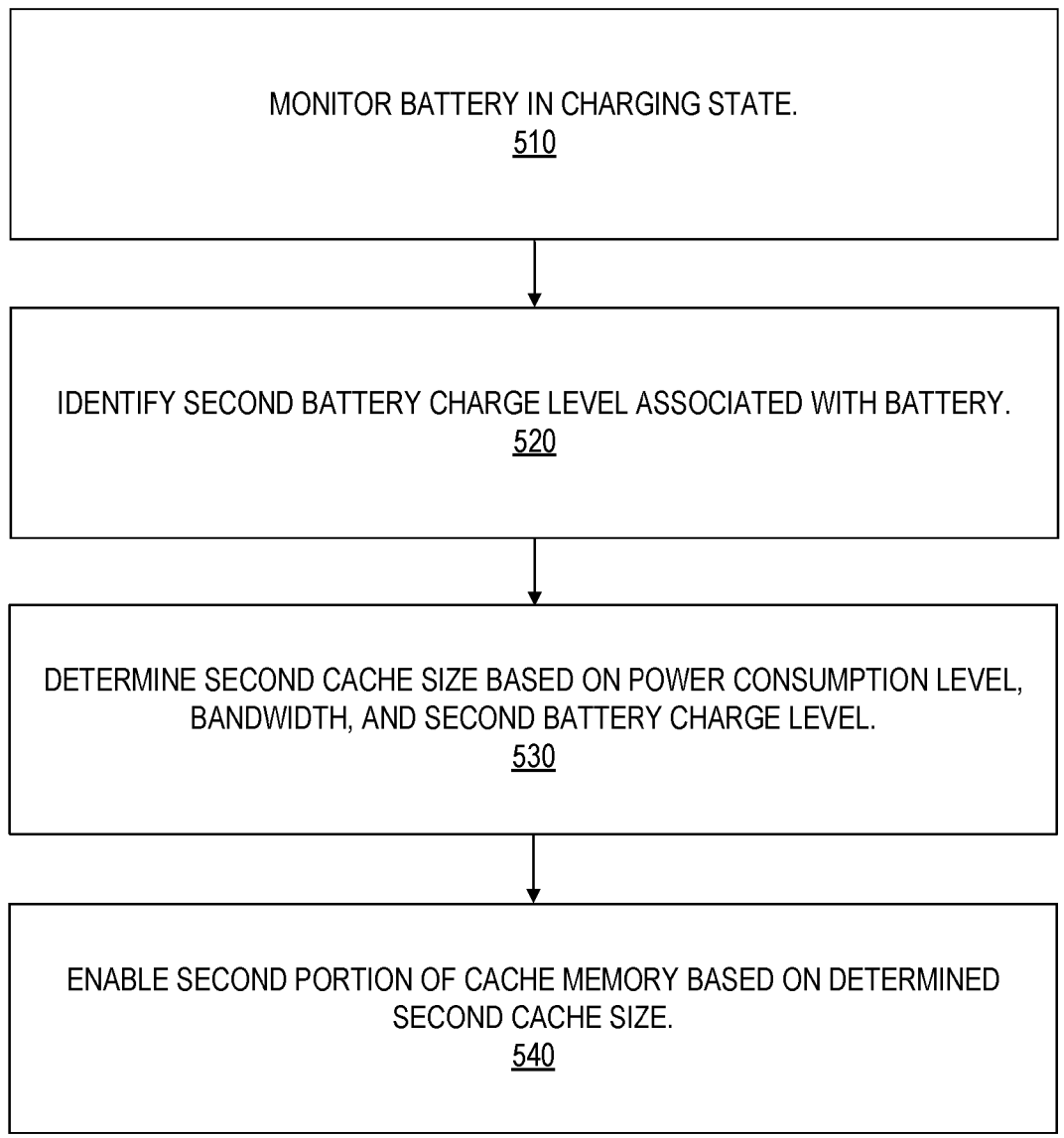
FIG. 5 illustrates a flowchart of selected elements of an embodiment of a method for enabling a second portion of the cache memory in the information handling system in response to the power-loss event.

FIG. 5 illustrates a flowchart of selected elements of an embodiment of a method for enabling a second portion of the cache memory in the information handling system in response to the power-loss event. It is noted that certain operations described in method 500 may be optional or may be rearranged in different embodiments.

In the method 500 illustrated in FIG. 5, OS 135 can monitor 510 battery 120 while in the charging state and can identify 520 a second battery charge level associated with battery 120. The second battery charge level may have a higher charge level than the first battery charge level. In response to identifying the second battery charge level, OS 135 can determine 530 a second cache size based on the power consumption level associated with the platform configuration, the bandwidth associated with flash memory medium 155, and the second battery charge level. The second cache size may have a larger cache size than the first cache size. OS 135 may enable 540 a second portion of the cache memory based on the determined second cache size.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for stepwise enablement of a cache memory in an information handling system, the method comprising:
    identifying, by an operating system, a power consumption level associated with a platform configuration of the information handling system;
    identifying, by the operating system, a bandwidth associated with a flash memory medium of the information handling system;
    identifying a first battery charge level associated with a battery of the information handling system, the battery in a charging state;
    determining a first cache size based on the power consumption level associated with the platform configuration, the bandwidth associated with the flash memory medium, and the first battery charge level associated with the battery; and
    enabling a first portion of the cache memory based on the determined first cache size;
    monitoring the battery in the charging state;
    identifying a second battery charge level associated with the battery, the second battery charge level having a higher charge level than the first battery charge level;
    determining a second cache size based on the power consumption level associated with the platform configuration, the bandwidth associated with the flash memory medium, and the second battery charge level, the second cache size having a larger cache size than the first cache size; and
    enabling a second portion of the cache memory based on the determined second cache size.

2. The method of claim 1, wherein monitoring the battery in the charging state comprises:
    receiving, by the operating system, a current charge level of the battery in the charging state, the current charge level received from a battery controller associated with the battery, the battery controller comprising an interface between the battery and the operating system.

3. The method of claim 1, wherein identifying the bandwidth associated with the flash memory medium comprises:
    accessing, by the operating system, a device descriptor stored in the flash memory medium; and
    retrieving information describing the bandwidth associated with the flash memory medium from the device descriptor.

4. The method of claim 1, wherein identifying the power consumption level associated with the platform configuration comprises:
    accessing, by the operating system, a platform descriptor stored in the information handling system; and
    retrieving information describing the power consumption level from the platform descriptor.

5. The method of claim 1, wherein the platform configuration of the information handling system comprises at least one of:
    a processor;
    a volatile memory medium including the cache memory; and
    the flash memory medium.

6. The method of claim 1, wherein the battery is in the charging state in response to a power-loss event, wherein the power-loss event comprises a loss of power being supplied to the information handling system.

7. An information handling system, comprising:
    a battery;
    a cache memory;
    a flash memory medium; and an operating system configured to:
- identify a power consumption level associated with a platform configuration of the information handling system;
- identify a bandwidth associated with the flash memory medium of the information handling system;
- identify a first battery charge level associated with the battery of the information handling system, the battery in a charging state;
- determine a first cache size based on the power consumption level associated with the platform configuration, the bandwidth associated with the flash memory medium, and the first battery charge level associated with the battery;
- enable a first portion of the cache memory based on the determined first cache size;
- monitor the battery in the charging state;
- identify a second battery charge level associated with the battery, the second battery charge level having a higher charge level than the first battery charge level;
- determine a second cache size based on the power consumption level associated with the platform configuration, the bandwidth associated with the flash memory medium, and the second battery charge level, the second cache size having a larger cache size than the first cache size; and
- enable a second portion of the cache memory based on the determined second cache size.

8. The information handling system of claim 7, wherein to monitor the battery in the charging state, the operating system is further configured to:
- receive a current charge level of the battery in the charging state, the current charge level received from a battery controller associated with the battery, the battery controller comprising an interface between the battery and the operating system.

9. The information handling system of claim 7, wherein to identify the bandwidth associated with the flash memory medium, the operating system is further configured to:
- access a device descriptor stored in the flash memory medium; and
- retrieve information describing the bandwidth associated with the flash memory medium from the device descriptor.

10. The information handling system of claim 7, wherein to identify the power consumption level associated with the platform configuration, the operating system is further configured to:
- access a platform descriptor stored in the information handling system; and
- retrieve information describing the power consumption level from the platform descriptor.

11. The information handling system of claim 7, wherein the platform configuration of the information handling system comprises at least one of:
- a processor;
- a volatile memory medium including the cache memory; and
- the flash memory medium.

12. The information handling system of claim 7, wherein the battery is in the charging state in response to a power-loss event, wherein the power-loss event comprises a loss of power being supplied to the information handling system.

13. A non-transitory computer-readable medium storing software comprising instructions executable by one or more computers which, upon such execution, cause the one or more computers to perform operations comprising:
- identifying, by an operating system, a power consumption level associated with a platform configuration of the information handling system;
- identifying, by the operating system, a bandwidth associated with a flash memory medium of the information handling system;
- identifying a first battery charge level associated with a battery of the information handling system, the battery in a charging state;
- determining a first cache size based on the power consumption level associated with the platform configuration, the bandwidth associated with the flash memory medium, and the first battery charge level associated with the battery;
- enabling a first portion of a cache memory based on the determined first cache size;
- monitoring the battery in the charging state;
- identifying a second battery charge level associated with the battery, the second battery charge level having a higher charge level than the first battery charge level;
- determining a second cache size based on the power consumption level associated with the platform configuration, the bandwidth associated with the flash memory medium, and the second battery charge level, the second cache size having a larger cache size than the first cache size; and
- enabling a second portion of the cache memory based on the determined second cache size.

14. The non-transitory computer-readable medium of claim 13, wherein monitoring the battery in the charging state comprises:
- receiving, by the operating system, a current charge level of the battery in the charging state, the current charge level received from a battery controller associated with the battery, the battery controller comprising an interface between the battery and the operating system.

15. The non-transitory computer-readable medium of claim 13, wherein identifying the bandwidth associated with the flash memory medium comprises:
- accessing, by the operating system, a device descriptor stored in the flash memory medium; and
- retrieving information describing the bandwidth associated with the flash memory medium from the device descriptor.

16. The non-transitory computer-readable medium of claim 13, wherein identifying the power consumption level associated with the platform configuration comprises:
- accessing, by the operating system, a platform descriptor stored in the information handling system; and
- retrieving information describing the power consumption level from the platform descriptor.

17. The non-transitory computer-readable medium of claim 13, wherein the platform configuration of the information handling system comprises at least one of:
- a processor;
- a volatile memory medium including the cache memory; and
- the flash memory medium.

* * * * *